US012603947B2

(12) United States Patent
Stritzelberger

(10) Patent No.: US 12,603,947 B2
(45) Date of Patent: Apr. 14, 2026

(54) NETWORK PORT CIRCUIT

(71) Applicant: R. STAHL SCHALTGERÄTE GMBH, Waldenburg (DE)

(72) Inventor: Jörg Stritzelberger, Öhringen (DE)

(73) Assignee: R. STAHL SCHALTGERÄTE GMBH, Waldenburg (DE)

( * ) Notice: Subject to any disclaimer, the term of this patent is extended or adjusted under 35 U.S.C. 154(b) by 75 days.

(21) Appl. No.: 18/835,526

(22) PCT Filed: Feb. 2, 2023

(86) PCT No.: PCT/EP2023/052575
§ 371 (c)(1),
(2) Date: Aug. 2, 2024

(87) PCT Pub. No.: WO2023/152024
PCT Pub. Date: Aug. 17, 2023

(65) Prior Publication Data
US 2025/0141984 A1 May 1, 2025

(30) Foreign Application Priority Data
Feb. 8, 2022 (DE) ..................... 10 2022 102 872.0

(51) Int. Cl.
*H04L 69/08* (2022.01)
*H04L 12/40* (2006.01)

(52) U.S. Cl.
CPC .............. *H04L 69/08* (2013.01); *H04L 12/40* (2013.01)

(58) Field of Classification Search
CPC ................................ H04L 69/08; H04L 12/40
See application file for complete search history.

(56) References Cited

U.S. PATENT DOCUMENTS 8,301,821 B2    10/2012   Ihle et al.
8,943,254 B2 *   1/2015   Tailliet ................ G06F 13/4295
                                                          713/340
(Continued)

FOREIGN PATENT DOCUMENTS

CN        209345193 U      9/2019
DE         10104705 A1     8/2002
(Continued)

OTHER PUBLICATIONS

German Office Action corresponding to DE Application No. 10 2022 102 872.0; Mailing Date, Nov. 10, 2022.
(Continued)

*Primary Examiner* — Henry Tsai
*Assistant Examiner* — John B Roche
(74) *Attorney, Agent, or Firm* — CANTOR COLBURN LLP

(57) ABSTRACT

The present disclosure relates to a network port circuit which uses transceiver modules and which function according to various protocols and at various bit rates. The transceiver module having a low bit rate is connected in parallel with all two-wire ports. The transceiver modules which function according to a second network protocol and at a higher data rate are individually assigned to the individual two-wire ports. Independently of the activation of the individual transceiver modules, a voltage source is active for supplying power to the two-wire buses connected to the dual-wire ports.

20 Claims, 2 Drawing Sheets

(56)  References Cited

U.S. PATENT DOCUMENTS

| | | | |
|---|---|---|---|
| 8,949,665 B2 | 2/2015 | Law et al. | |
| 9,509,372 B2 | 11/2016 | Seifried | |
| 9,742,269 B2 | 8/2017 | Seifried | |
| 9,762,409 B2 | 9/2017 | Ringkamp et al. | |
| 2005/0156664 A1 | 7/2005 | Randahl et al. | |
| 2006/0158815 A1 | 7/2006 | De Haas | |
| 2010/0064082 A1 | 3/2010 | Ihle et al. | |
| 2011/0131455 A1 | 6/2011 | Law et al. | |
| 2012/0030388 A1* | 2/2012 | Bas | G06F 13/4295 |
| | | | 710/110 |
| 2013/0073760 A1 | 3/2013 | Wiesgickl | |
| 2015/0280783 A1 | 10/2015 | Seifried | |
| 2015/0288192 A1 | 10/2015 | Wang et al. | |
| 2016/0141955 A1 | 5/2016 | Seifried | |
| 2016/0182689 A1* | 6/2016 | Lewis | H04L 49/3009 |
| | | | 370/466 |
| 2016/0352534 A1 | 12/2016 | Ringkamp et al. | |
| 2021/0266205 A1 | 8/2021 | Michaeli et al. | |

FOREIGN PATENT DOCUMENTS

| | | | |
|---|---|---|---|
| DE | 102005000811 A1 | 8/2005 | |
| DE | 102006055513 A1 | 11/2007 | |
| DE | 102010037262 A1 | 4/2011 | |
| DE | 102010029219 A1 | 11/2011 | |
| DE | 102012110732 B3 | 6/2013 | |
| DE | 102014116594 A1 | 5/2016 | |
| DE | 112015000240 B4 | 7/2017 | |
| EP | 2421203 A1 | 2/2012 | |

OTHER PUBLICATIONS

International Search Report for International Application No. PCT/EP2023/052575; Mailing Date, Sep. 5, 2023.
Partial German Search Report for International Application No. PCT/EP2023/052575; Mailing Date, Jun. 1, 2023.
Written Opinion for International Application No. PCT/EP2023/052575; Mailing Date, Sep. 5, 2023.

* cited by examiner

NETWORK PORT CIRCUIT

CROSS REFERENCE TO RELATED APPLICATIONS

This application is a National Stage of PCT Application No. PCT/EP2023/052575 filed on Feb. 2, 2023, which claims priority to German Patent Application No. DE 10 2022 102 872.0 filed on Feb. 8, 2022, the contents each of which are incorporated herein by reference thereto.

TECHNICAL FIELD

The subject matter of the present disclosure is an interface circuit with multiple connections for a two-wire bus that is configured for operation according to different protocols as well as for permanent current or voltage supply of connected network components.

BACKGROUND

An interface circuit using different signalizing protocols is known from DE 11 2015 000 240 B4. This interface circuit comprises a transmitter as well as a receiver separate therefrom, which supply and pick-up their signals at different points of the interface circuit via different resistors or reactances. The transmitter and the receiver are configured for the protocols transmitted via the two-wire bus.

BRIEF SUMMARY

It is an object of the present disclosure to provide an interface circuit that is configured for operation with different protocols.

This object is solved by means of the network circuit, for connection of network components that have different network protocols, the network protocol circuit having a first transceiver module that is configured to transmit and receive data with a first data rate according to a first protocol, multiple second transceiver modules that are configured to transmit and receive data with a second data rate according to a second protocol, multiple two-wire ports, wherein the first transceiver module is commonly assigned to all two-wire ports and wherein exactly one of the second transceiver modules is assigned to each two-wire port.

The network circuit according to the present disclosure comprises two transceiver modules that are configured for different protocols and different data rates. Thereby, the first transceiver module is commonly assigned to all two-wire ports. The second transceiver modules are individually assigned to the two-wire ports. With this concept, transceiver modules of different configuration can be combined with each other that have different requirements and possibilities with regard to the parallel operation of different interfaces. Particularly, it can be achieved to combine a first transceiver module, for example sending and receiving according to the protocol Profibus-PA or Foundation Fieldbus H1, with second transceiver modules that operate, for example, according to the 10BASE-T1L or Ethernet-APL protocol. The network port circuit is thereby particularly downward compatible. Present sensors of a two-wire bus system that operate according to the Profibus-PA can be connected to the network port circuit as well as other (newer) apparatuses operating according to the Ethernet-APL.

It is in addition possible to use the two-wire bus line for current supply of components that are connected to the two-wire bus. The first transceiver module can particularly be configured to operate according to the Fieldbus communication protocol according to IEC61158-2, the second transceiver module according to the communication protocol 10BASE-T1L according to IEEE802.3cg.

The concept according to the present disclosure allows the combination of transceiver modules with significantly different bit rates. The bit rate can be particularly different about more than the factor 100. For example, the first transceiver module can operate with a bit rate of 31.25 kbit/s, while the second transceiver module operates with a bit rate of approximately 10 Mbit/s.

A high frequency blocking circuit can be arranged between the two-wire bus connections and the first transceiver module. Particularly, this high frequency blocking circuit can be configured to selectively deblock or block the passage of high frequency signals, however, to always allow direct current and direct voltage signals to pass. Exactly one high frequency blocking circuit can be assigned individually to each two-wire bus connection. With view from the two-wire bus connections behind the high frequency blocking circuits, the high frequency blocking circuits can be connected parallel to one another and can be connected to the transceiver module as well as to a voltage source. In this manner, the voltage supply of apparatuses connected to the two-wire bus is always guaranteed and indeed independent from whether the high frequency path from the two-wire bus connection to the first transceiver module is deblocked or not.

The high frequency blocking circuit allows, in addition, to keep signals with the higher bit rate, appropriate for the second transceiver modules, away from the first transceiver module if it is inactive. In this manner, the high frequency blocking circuit decouples the signals with the higher bit rate from the voltage supply and the first transceiver module. In doing so, disturbances in the signal transmission of the second transceiver module are avoided.

The high frequency blocking circuit can be formed in a simple manner by two coils that are respectively arranged in each of the two-wire bus lines and that are coupled in transformer-type manner and connected oppositely. Opposite connection means that one of the coils has its coil beginning at the side facing the two-wire port, while the other of the coils has its coil beginning at the side facing away from the two-wire port. A switch arranged parallel to one of the two coils to bypass it selectively can be used for deactivation of this high frequency blocking circuit.

As mentioned, the network port circuit according to the present disclosure can comprise a voltage source for current supply of components that are connected to the network port circuit via the two-wire bus. An ohmic resistor can be provided for each two-wire bus connection of the network port circuit in series with the current and voltage source, wherein the ohmic resistor limits the current output from the two-wire bus connection to a safe amount. Thereby the two-wire bus connection of the network port circuit can comply with the explosion protection requirements according to the standard intrinsic safety according to IEC 60079-11 (Ex-i).

A connection point where the lines of the two-wire bus connections are connected in parallel with one another can be arranged between the high frequency blocking circuit and the transceiver module. Thereby the two-wire bus connections of the network port module of the first transceiver module are connected in parallel thereto. By selectively deblocking and blocking of individual high frequency blocking circuits the signal path from the first transceiver module to a selected two-wire bus connection can be deblocked or blocked. Insofar the high frequency blocking circuits form signal splitters. However, the current and voltage supply of the individual two-wire bus connections remains permanently active independent therefrom.

The voltage source is preferably connected in series to an inductive impedance, for example a coil. The dimensioning of the coil is preferably made so that it forms a barrier for frequencies of the lower bit rate of the first transceiver module respectively. In doing so it is avoided that the voltage source disturbs or negatively influences the signals of the first transceiver module.

Between the first transceiver module and the second transceiver module a high frequency blocking circuit having a bypass switch can be arranged which is closed if the respective second transceiver module is active. If closed, the bypass switch connects a line, which is connected with the coil via a diode, to ground. The first transceiver module is thereby inactive at least for the port at which the respective second transceiver module is active.

It can be provided that the bypass switch is exclusively open (non-conductive) if the first transceiver module is active. The bypass switch connected to ground avoids a mutual influence of the signals of the first and second transceiver module at the port at which the second transceiver module is active. The diodes in the high frequency blocking circuits decouple the individual ports from one another, so that the first transceiver module remains active for all of the ports in which the bypass switch of the respective high frequency blocking circuit is non-conductive. If the current is fed back via the coil for the APL-signals, then the 31 kbit signal on the two-wire port is visible in spite of an active 10 Mbit transmitter, because the high frequency blocking circuit is only suitable for the high frequencies, but allows the 31 kbit to pass outwardly. However, the bypass switch connects the 31 kbit signal in low-ohmic manner to ground and thus impedes the latter to modulate the 10 Mbit signal.

The second transceiver modules are preferably arranged in series with an activation switch respectively that is closed if the respective second transceiver module is active. It is opened if it is inactive. This supports the signal quality of the signals of the second transceiver modules on the two-wire bus. Concurrently, the second transceiver modules can comprise a line termination resistance, the dimension of which corresponds to the characteristic impedance of the two-wire bus line.

BRIEF DESCRIPTION OF THE DRAWINGS

Additional details of advantageous embodiments of the present disclosure are derived from the figures, the drawing, as well as the associated description.

The drawings show.

DETAILED DESCRIPTION

Figures 1, 2:
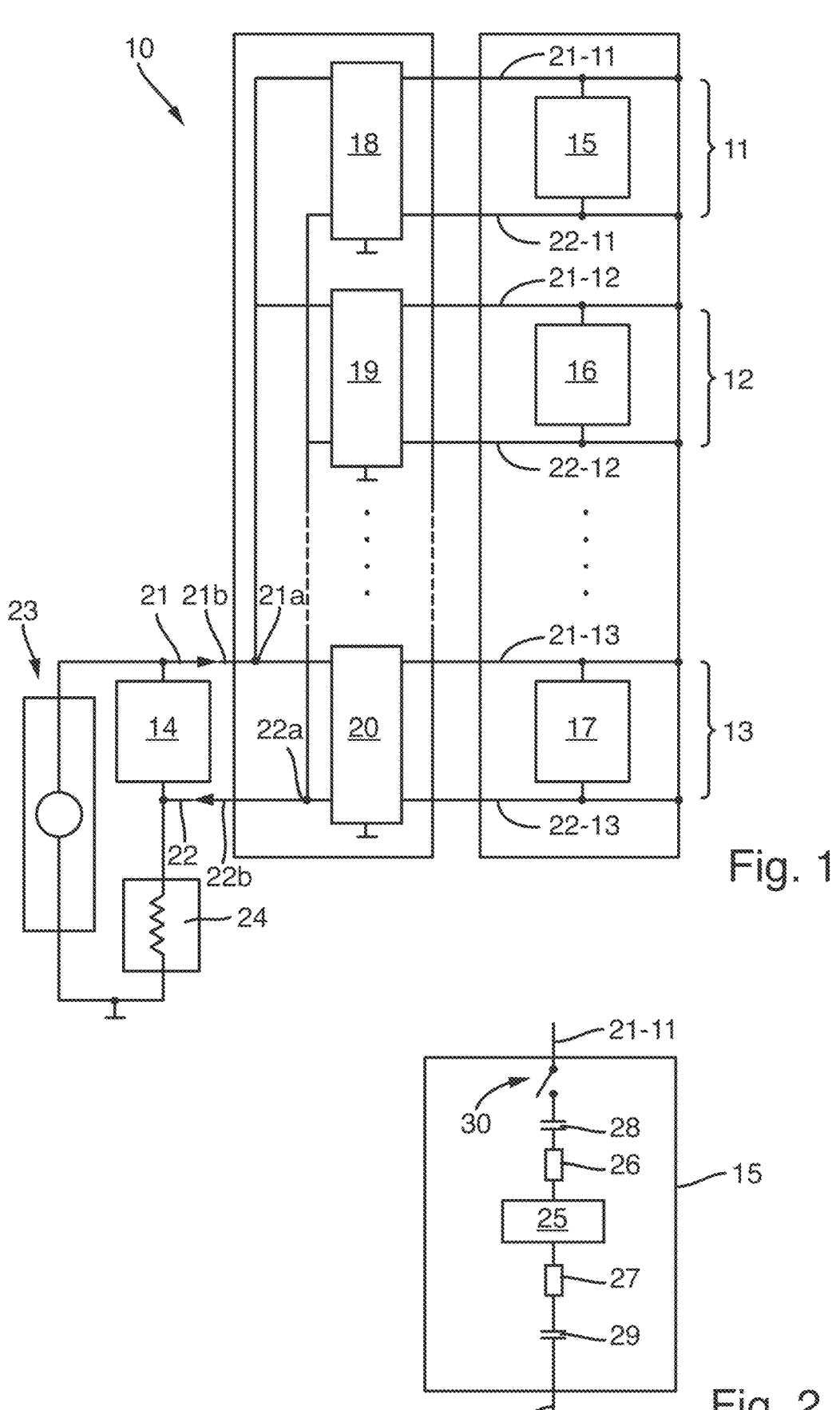
FIG. 1 the network port circuit according to the present disclosure in a block diagram, FIG. 2 a transceiver module of the network port circuit according to FIG. 1, FIG. 3 a high frequency blocking circuit of the network port circuit according to FIG. 1, FIG. 4 a transceiver module of the network port circuit according to FIG. 1 having a low bit rate.

A network port circuit 10 according to the present disclosure is illustrated in FIG. 1. The network port circuit 10 comprises multiple, in general any number of two-wire ports 11, 12, 13 to which network components, such as sensors, can be connected via two-wire bus lines. It can be network components that communicate according to a first protocol, for example IEC 61158-2 (Profibus-PA) or according to the second protocol, for example 10BASE-T1L or Ethernet-APL. For communication with the first mentioned protocol, a first transceiver module 14 is provided. This transceiver module 14 is provided to operate all of the two-wire ports 11 to 13.

For the communication according to the second protocol, second transceiver modules 15 to 17 are provided. Thereby, each transceiver module 15 to 17 is individually assigned to one of the two-wire ports 11 to 13 respectively. Each second transceiver module 15 to 17 is a two-terminal network, which is connected to the two connections of the respective two-wire port 11 to 13.

Between the second transceiver modules 15 to 17 and the first transceiver module 14, a group of high frequency blocking circuits 18, 19, 20 is arranged that are on one hand configured to allow direct voltage and direct current to pass. On the other hand, they can be transferred from a high frequency blocking condition into a condition in which they allow at least the transmission and receipt frequency of the first transceiver module 14 to pass, and thus, for example, for a bit rate of 31 kbit/s.

On the side of the first transceiver module 14, the high frequency blocking circuits 18 to 20 are connected in parallel at circuit points 21a, 22a and are connected to the first transceiver module 14. As two-terminal network the latter is in turn connected between the two lines 21-11, 22-11 of the two-wire bus that lead to the two-wire port 11. Respective lines 21-12, 22-12 as well as 21-13, 22-13 lead to the two-wire ports 12 and 13. The current flow directions of the direct current originating from the voltage source 23 are indicated in FIG. 1 by means of arrows 21b, 22b.

A voltage source 23 of, for example, 12V serves for current and voltage supply of network components connected to the two-wire bus. On one side the voltage source 23 is connected with line 21 and on the other side with ground (zero potential). The line 22 is connected to ground via a suitable high frequency blocking impedance, for example a coil 24, a gyrator or another high frequency blocking device.

The transceiver module 15 is arranged between the lines 21-11, 22-11. The transceiver module 16 is arranged between the lines 21-12, 22-12. The transceiver module 17 is arranged between the lines 21-13, 22-13. FIG. 2 illustrates the transceiver module 15. It is identically constructed as the transceiver modules 16, 17, so that the following description applies respectively to all second transceiver modules 15, 16, 17.

The transceiver module 15 comprises a transmitter/receiver 25 configured for the second protocol. It is connected to the lines 21-11, 22-11 via resistors 26, 27 and coupling capacitors 28, 29 connected in series. In addition, the series connection formed in this manner can be provided with a switch 30 with which the second transceiver module 15 is switched on and off. If switch 30 is open (non-conductive), the transmitter/receiver 25 is separated from the two-wire bus. However, if switch 30 is closed, the two resistors 26, 27 form a terminal resistor corresponding to the characteristic resistance of the two-wire line for the latter.

Figure 3:
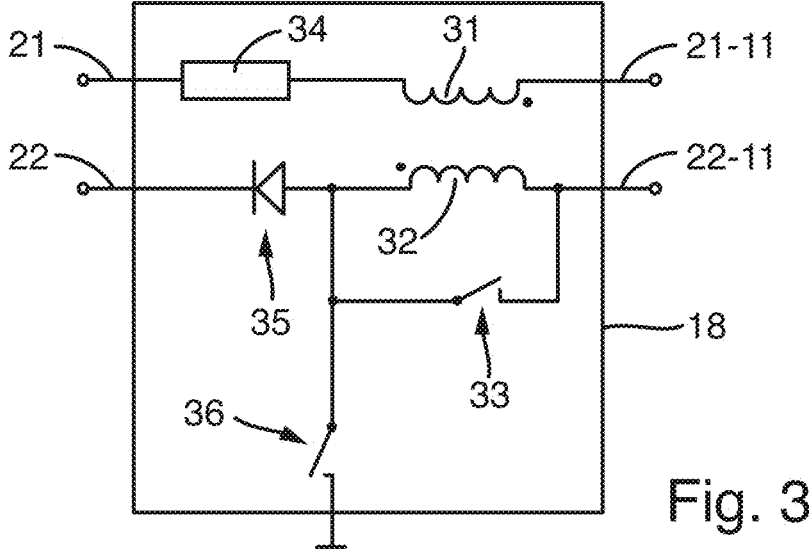

FIG. 3 illustrates the high frequency blocking circuit 18, which is similar in configuration with the high frequency blocking circuits 19, 20. It comprises two coils 31, 32 coupled in transformer-type manner that are oppositely arranged in the lines 21-11, 22-11. Thus, they form a direct current path, however, block alternating voltages. For bypassing at least one of the coils 31, 32, a switch 33 is provided. If it bypasses coil 32, the alternating voltage blocking effect of the arrangement consisting of the two coils 31, 32 is cancelled. Due to the transformer coupling of the two coils 31, 32 with each other, not only the blocking effect, but also coil 31 is disabled.

At least optionally, the high frequency blocking circuit 18 comprises a protection resistor 34 that limits the amount of the current supplied by voltage source 23 flowing through lines 21-11, 22-11. The resistor 34 can for this reason serve to make the connected two-wire bus intrinsically safe. By means of the resistor 34, the voltage and the current are limited to values that have to be considered as intrinsically safe complying with the standard in the sense of explosion protection. For this purpose, in order to avoid creating ignition sources in the sense of explosion protection, the voltages applied to the two-wire bus and the currents flowing therein are limited to intrinsically safe values according to standard IEC 60079-11.

Also optionally, the high frequency blocking circuit comprises a diode 35 that is poled in flowing direction for current provided by the voltage source 23. In addition, the high frequency blocking circuit 18 can comprise a switch 36 via which the line 22 can be connected to ground. Thus, the current flows from line 22 directly to ground. Thereby, the first transceiver module 14 has no influence on the respective two-wire bus port 11, 12, 13.

Figure 4:
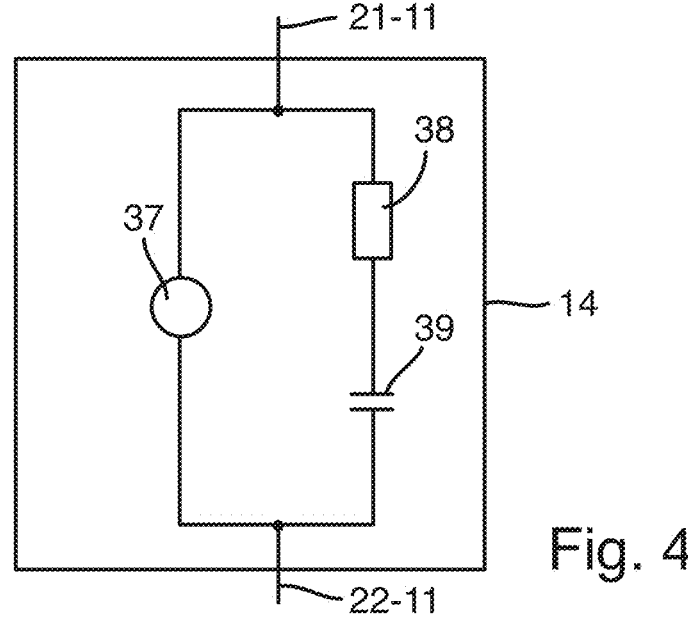

FIG. 4 illustrates the first transceiver module 14 having a transmitter/receiver 37, which is configured for transmitting and receiving data according to the first protocol. If it is a protocol in which data are conveyed as currents, a resistor 38 that is also denoted as terminal resistor or terminator and, as necessary, a coupling capacitor 39 are switched parallel to the transmitter/receiver 37 in order to turn current impulses that are sent by network components into voltage impulses detectable by transmitter/receiver 37.

The network port circuit described so far operates as follows:

For sending and receiving information according to the first protocol, the first transceiver module 14 is always active. For explanation purposes, it is first assumed that the second transceiver modules 15, 16, 17 are however inactive. This condition is achieved in that at least the high frequency blocking circuit 18, 19 or 20 that connects the transceiver module 14 with the respectively active two-wire bus port 11, 12 or 13, is switched in a high frequency passing condition. For this purpose, switch 33 is closed (made conductive). The switch 36 is however opened (blocked). In doing so, line 22 is separated for high frequency from ground and the high frequency barrier otherwise formed by coils 31, 32 is ineffective. The transceiver module 14 is now connected with the desired two-wire port, for example with two-wire port 11. A network component connected thereto receives on one hand current from the voltage source 23 and can on the other hand directly communicate with transceiver module 14.

The same applies for the other two-wire ports 12, 13 that can be activated in accordance with the first protocol in that their respective high frequency blocking circuits 19, 20 are switched to allow high frequency to pass (switch 3 conductive, switch 36 non-conductive) as described above.

However, if no communication between the transceiver module 14 and a two-wire port 11, 12 or 13 shall take place, the respective high frequency blocking circuit 18, 19, 20 is transferred into the blocking condition. For this purpose, the respective switch 33 is opened (made non-conductive) while switch 36 is closed (made conductive). The network port circuit 10 is now ready in order to operate as necessary according to the second network protocol in that one or more or all second transceiver modules 15 to 17 are activated.

For activation of these second transceiver modules 15 to 17 the switch 30 comprised therein is closed (made conductive), so that the respective transmitter/receiver 25 is connected with the respective two-wire port 11, 12 or 13. Also in this condition the two-wire buses connected to the two-wire ports 11, 12, 13 are supplied with current via the closed switches 36 from the source 23. However, if one of the second transceiver modules 15 to 17 shall be switched in inactive condition again, switch 30 is again opened, that is made non-conductive. With view from the respective two-wire port 11, 12, 13 the respective transceiver module 15 to 17 thereby becomes invisible again.

Preferably switch 30 of one of the transceiver modules 15 to 17 is only closed and thus the respective transceiver module 15 to 17 is only activated, if the assigned high frequency blocking circuit 18 to 20 connected to the same line pair 21-11/22-1, 21-12/22-12, 21-13/22-13. In the active condition the respective high frequency blocking circuit 18 to 20 blocks high frequency voltages and currents from the second transceiver modules 15 to 17 in that the switch 33 is open (non-conductive) and the switch 36 is closed (conductive).

The described network port circuit 10 according to the present disclosure uses transceiver modules 14 as well as 15 to 17 that operate according to different protocols and with different bit rates. The transceiver module 14 having the lower bit rate is connected in parallel to all two-wire ports 11, 12, 13. The transceiver modules 15 to 17 operating according to a second network protocol and with higher data rates are individually assigned to the individual two-wire ports 11 to 13. Independent from the activation of the individual transceiver modules 14 to 17, a voltage source 26 is active for current supply of two-wire buses connected to the two-wire ports 11 to 13.

LIST OF REFERENCE SIGNS 10 network port circuit
11-13 two-wire ports
14 first transceiver module
15-17 second transceiver modules (15')
18-20 high frequency blocking circuit
21, 22 lines
21-11 first line of high frequency blocking circuit 18 to two-wire port 11
22-11 second line of high frequency blocking circuit 18 to two-wire port 11
21-12 first line of high frequency blocking circuit 18 to two-wire port 12
22-12 second line of high frequency blocking circuit 18 to two-wire port 12
21-13 first line of high frequency blocking circuit 18 to two-wire port 13
22-13 second line of high frequency blocking circuit 18 to two-wire port 13
23 voltage source
24 coil
25 transmitter/receiver
26, 27 resistor
28, 29 coupling capacitor
30 switch
31, 32 coil 33 switch
34 ohmic resistor
35 diode
36 switch
37 transmitter/receiver
38 resistor
39 coupling capacitor

The invention claimed is:

1. A network protocol circuit for connection of network components that have different network protocols, the network protocol circuit having:
a first transceiver module that is configured to transmit and receive data with a first data rate according to a first protocol,
multiple second transceiver modules that are configured to transmit and receive data with a second data rate according to a second protocol, and
multiple two-wire ports,
wherein the first transceiver module is commonly assigned to all two-wire ports and wherein exactly one of the second transceiver modules is assigned to each two-wire port.

2. The network protocol circuit according to claim 1, wherein the first data rate is lower than $\frac{1}{100}$ of the second data rate.

3. The network protocol circuit according to claim 1, wherein high frequency blocking circuits are arranged between the two-wire ports and the first transceiver module.

4. The network protocol circuit according to claim 3, wherein each high frequency blocking circuit comprises two coils coupled in transformer-type manner with each other, which are arranged in lines, leading to the two-wire ports.

5. The network protocol circuit according to claim 4, wherein the high frequency blocking circuit is connected with a deactivation switch.

6. The network protocol circuit according to claim 3, wherein the two-wire bus ports are connected with the first transceiver module via two lines, and wherein in at least one of the two lines, an ohmic resistor is arranged that is individually assigned to the respective two-wire port.

7. The network protocol circuit according to claim 6, wherein a first connection point at which originating lines of the two lines of the two-wire bus ports are connected with each other, and a second connection point, at which incoming lines of the two lines of the two-wire bus ports are connected with each other, are arranged between the high frequency blocking circuits and the first transceiver module.

8. The network protocol circuit according to claim 1, wherein the two-wire bus ports are connected in parallel with the first transceiver module.

9. The network protocol circuit according to claim 1, wherein the two-wire bus ports are connected in parallel with each other to a voltage source.

10. The network protocol circuit according to claim 9, wherein a coil, a gyrator or another high frequency blocking device is connected in series to the voltage source.

11. The network protocol circuit according to claim 10, wherein a switch for selectively discharging current from a line to ground is arranged in parallel to the coil or the gyrator, potentially via intermediate connection of a decoupling diode.

12. The network protocol circuit according to claim 3, wherein the second transceiver module is connected to two lines, leading to the two-wire port respectively between the high frequency blocking circuits and the two-wire port.

13. The network protocol circuit according to claim 1, wherein the second transceiver module is connected in series with an activation-deactivation-switch.

14. The network protocol circuit according to claim 1, wherein the second transceiver module is connected in series with at least one ohmic resistor.

15. The network protocol circuit according to claim 1, wherein the second transceiver module is connected in series with at least one coupling capacitor.

16. The network protocol circuit according to claim 2, wherein high frequency blocking circuits are arranged between the two-wire ports and the first transceiver module.

17. The network protocol circuit according to claim 16, wherein each high frequency blocking circuit comprises two coils coupled in transformer-type manner with each other, which are arranged in lines, leading to the two-wire ports.

18. The network protocol circuit according to claim 17, wherein the high frequency blocking circuit is connected with a deactivation switch.

19. The network protocol circuit according to claim 18, wherein the two-wire bus ports are connected with the first transceiver module via two lines, and wherein in at least one of the two lines, an ohmic resistor is arranged that is individually assigned to the respective two-wire port.

20. The network protocol circuit according to claim 19, wherein a first connection point at which originating lines of the two lines of the two-wire bus ports are connected with each other, and a second connection point, at which incoming lines of the two lines of the two-wire bus ports are connected with each other, are arranged between the high frequency blocking circuits and the first transceiver module.

* * * * *